W. C. HEINDL.
THERMOSTATIC REGULATOR.
APPLICATION FILED MAR. 29, 1915.

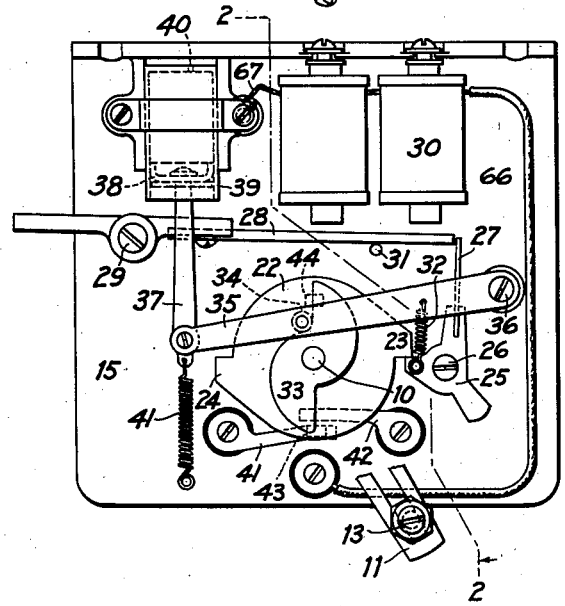

1,218,768.

Patented Mar. 13, 1917.
2 SHEETS—SHEET 2.

Witnesses:
Clarence W. Barroll
D. Gurnee

Inventor:
William C. Heindl
by Davis Davis
his attorneys

UNITED STATES PATENT OFFICE.

WILLIAM C. HEINDL, OF ROCHESTER, NEW YORK.

THERMOSTATIC REGULATOR.

1,218,768.  Specification of Letters Patent.  Patented Mar. 13, 1917.

Application filed March 29, 1915. Serial No. 17,867.

*To all whom it may concern:*

Be it known that I, WILLIAM C. HEINDL, a citizen of the United States, and resident of Rochester, in the county of Monroe and State of New York, have invented certain new and useful Improvements in Thermostatic Regulators, of which the following is a specification.

This invention relates to thermostatic regulators such as are employed, in connection with heating systems, to regulate the temperature of a building.

One object of the invention is to economize in the use of electric current in connection with the thermostatic regulator. It is common in the use of such devices, to adjust the drafts of the heater for slow combustion and a low temperature during the night, but to provide the thermostat with a clock which automatically adjusts the mechanism for a higher temperature at a certain time in the morning. Since close regulation of the heater is not necessary during the night, I propose to economize in the use of electric current by so arranging the regulator that when it is set for a low temperature at night the electric controlling-circuit is broken, so that no current will flow.

Another object of the invention is to improve the construction of the actuating-mechanism by which the drafts of the heater are operated, in such a manner as to simplify this mechanism and render it stronger and more reliable, while at the same time providing, in a simple and effective way, for opening and closing the drafts gently and without noise. To this end I dispense with the gear-trains and the forms of escapement which have heretofore been employed, and employ a novel and simple escapement-mechanism characterized particularly by the fact that it is combined with a dash-pot, or similar device, for retarding its movement in the proper manner.

Other objects of the invention, and the features of construction by which they are attained, will be set forth in connection with the following description of the illustrated embodiment of the invention.

In the accompanying drawings:—

Figure 1 is a front-elevation of the actuating-mechanism of a thermostatic regulator embodying the present invention, with the cover removed and certain parts broken away to show the construction more clearly;

Fig. 2 is a section on the line 2—2 in Fig. 1, looking from right to left in the latter figure;

Fig. 3 is similar to Fig. 1, except that it shows the parts in a position assumed by them when in operation;

Fig. 4 is a rear-elevation of certain parts of the actuating-mechanism, including the sprocket-chain and weight by which power is provided;

Figure 5:
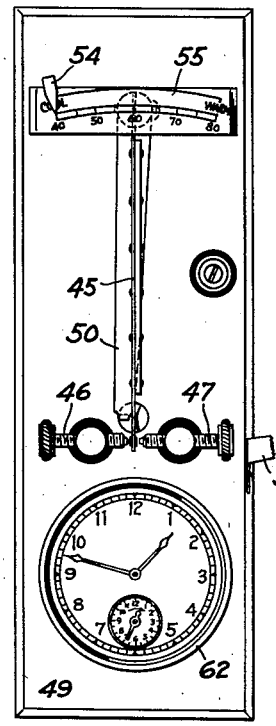
Fig. 5 is a front-elevation of the thermostat and the parts immediately associated therewith, with the cover removed.

The actuating-mechanism comprises a horizontal shaft 10 carrying, at opposite ends, two cranks 11 and 12 which are provided with adjustable crank-pins 13 and 14. These crank-pins may be connected, by means of chains in the usual manner, with the drafts or dampers of the heater which is to be regulated. The shaft 10 is rotatable in a bearing-sleeve formed on a base-plate 15 which may be fixed in any convenient location near the heater.

The power for rotating the shaft 10 and actuating the drafts is provided through a sprocket-wheel 16 which is mounted on the shaft. A chain 17, passing over the sprocket-wheel, carries a weight 18 at one end which tends to descend and rotate the sprocket-wheel and the shaft. In order that the weight may be raised again to operative position after it has completed its descent, the sprocket-wheel is arranged to turn on the shaft, and is normally coupled with the shaft by means of ratchet-teeth 19, of which one is always in engagement with a dog 20 on the crank-arm 12, the parts being held in such engagement by a coiled spring 21 which presses the sprocket-wheel toward the crank-arm. When the weight is to be raised the free end of the chain 17 is pulled downwardly by the user, and the ratchet-teeth then pass idly by the dog 20, permitting the sprocket-wheel to be rotated and the weight to be raised.

The rotation of the power-shaft 10 is controlled by an escapement-mechanism comprising a disk 22, which is fixed to the shaft and provided with two diametrically-arranged teeth 23 and 24. These teeth coöperate with a lug on a detent 25 which is mounted on a pivot 26 projecting from the base-plate 15. The detent has an upwardly-projecting arm 27, in the form of a thin plate of spring-metal, and this arm coöperates with an armature 28 which is mounted on a pivot 29. The armature coöperates with an electromagnet 30, and when the magnet is deënergized the armature rests upon a stop-pin 31, in such a position that its right-hand end forms an abutment against which the upper end of the arm 27 can rest. In this manner the detent is prevented from swinging to the left, and the escapement-disk 22 is held against rotation by the engagement of one of its teeth with the detent, as shown in Fig. 1. When the magnet is energized, however, the armature is raised, thus releasing the detent and the tooth 23 or 24, as the case may be, rocks the detent to the left, and thus disengages itself therefrom, whereupon the shaft 10 makes a half-rotation. Immediately after the disengagement of the tooth with the detent the latter is swung back to normal position by means of a spring 32, and before the completion of the half-rotation of the shaft the magnet has been deënergized by means hereinafter described, so that the armature falls and thus again locks the detent so that it can arrest the rotation of the disk and the shaft.

In order that the escapement may not be brought to a sudden stop, and also to prevent slamming of the drafts of the furnace, a retarding-device is associated with the escapement-mechanism. For this purpose a double-throw cam 33 is fixed to the disk 22, and this cam engages a roller 34 mounted on a cam-lever 35. The lever 35 is pivoted, at its right-hand end, on a screw 36 fixed in the base-plate 15, while the other end of the lever is pivoted to a piston-rod 37 carrying a piston 38 at its upper end. This piston moves in an air-cylinder 39 which is provided with a small vent or leak-opening 40. When the disk 22 is rotated the cam causes the cam-lever to rise, thus raising the piston in the cylinder, and this movement of the piston is retarded by the air and is not completed until sufficient air has leaked out to permit the piston stroke being completed. The form and arrangement of the cam-mechanism is such, owing partly to the compressibility of the air and the shape of the cam-surfaces, but particularly to the fact that the cam acts through a progressively increasing radius, that the retardation is slight during the first part of the rotative movement, but increases rapidly toward the end of this movement. Accordingly, the entire time consumed in the operation of the mechanism is small, but the last part of the movement is sufficiently slow to accomplish the desired results.

Just prior to the completion of each operative movement of the mechanism the cam-roller 34 escapes from the highest point of the cam 33, and the cam-lever and the piston are then drawn down by a spring 41 which is attached to the left-hand end of the lever, as shown.

In order that the current which energizes the magnet may be interrupted immediately after the detent has been released, so that current may be economized, and also to prevent more than one half-rotation of the escapement-mechanism at a time, the escapement-disk 22 is provided on the rear with two contact-blocks 43 and 44. These blocks are located at different distances from the axis of rotation, so that they coöperate, respectively, with two contact-springs 41 and 42 which are mounted on, but insulated from, the base-plate 15. In each fixed position of the escapement-disk one or the other of these contact-blocks is in engagement with the corresponding contact-spring, and it is through these parts that the circuit of the electromagnet is closed, but during the first part of the rotation of the escapement-disk the contact is broken, thus deënergizing the magnet.

Figure 6:
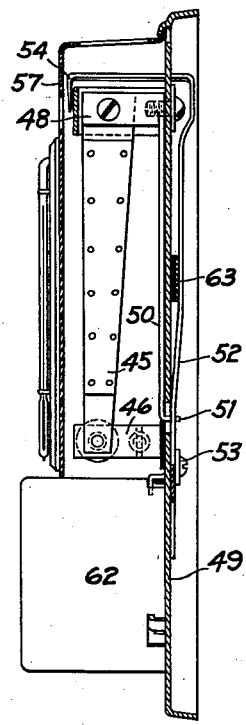
Fig. 6 is a side-elevation, partly in vertical section, of the same parts.
Figure 7:
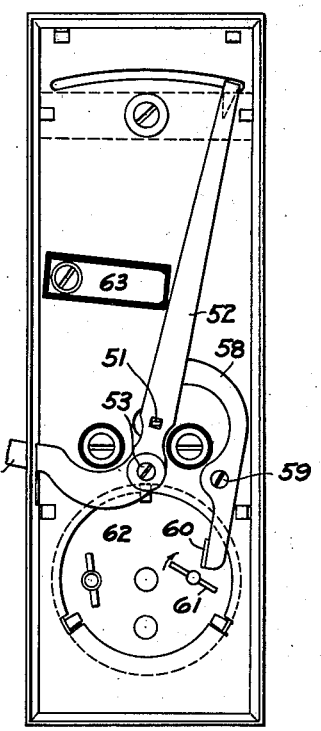
Fig. 7 is a rear-elevation of the same.

The thermostat, as shown in Figs. 5, 6, and 7, comprises the usual compound thermostatic spring 45, which coöperates with two oppositely-disposed contact-screws 46 and 47 mounted in posts fixed on, but insulated from, a base-plate 49. The spring is fixed, at its upper end, to a post 48 which is pivotally mounted on the base-plate. In order that the thermostat may be adjusted for different temperatures an arm 50 is fixed to, and projects downwardly from, the post 48, and its rearwardly-bent extremity 51 engages an opening in a lever 52 which is mounted on a pivot 53 on the base-plate. When the lever 52 is swung from one side to another it rocks the arm 50 and the post 48, thus swinging the thermostatic spring from one side to another, in the usual manner. The lever 52 is provided, at its upper end, with a pointer 54 which coöperates with a graduated scale 55 mounted on the base-plate 49. As a convenient means for swinging the lever 52 it is provided with an arm 56 which projects laterally through a slot in the side-flange of the base-plate.

As is common in devices of the kind in question, a clock 62 is provided for swinging the lever 52 from low-temperature position to high-temperature position at a predetermined time. To this end a lever 58 is mounted on a pivot-screw 59 at the back of the base-plate, and the upper end of this lever is adapted to coöperate with the lever 52, while its lower end is provided with a lug 60 which may be engaged by a winding-key 61 on the clock 62. This winding-key is similar in operation to that of the alarmmechanism of an alarm-clock, so that it is rotated in the direction of the arrow in Fig. 7 whenever the mechanism wound by it is released at the predetermined time by the time-mechanism of the clock. As such a construction is well known it need not be further described herein.

In connection with the thermostat the novel feature peculiar to the present invention is an arrangement by which the main electric circuit may be broken at the same time that the lever 52 is swung to its extreme low-temperature position. For this purpose a contact-spring 63 is fixed to, but insulated from, the base-plate 49 in such a position that it will be engaged by the lever 52 in all but the extreme low-temperature position of the latter, and through these parts the main circuit is completed.

Figure 8:
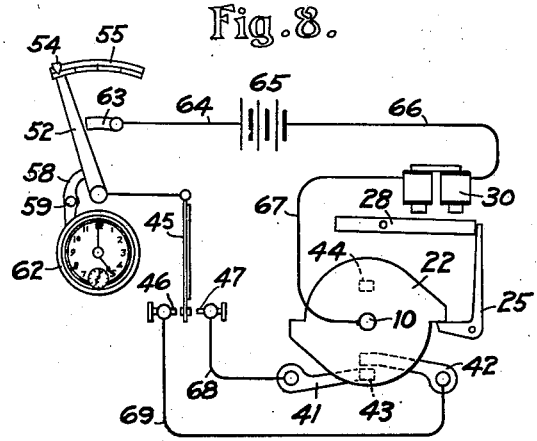
Fig. 8 is a diagram showing particularly the electrical connections of the apparatus.

The electric circuits are completely illustrated in the diagram Fig. 8. As shown therein, a battery 65 is connected, by a wire 64, with the contact-spring 63, while another wire 66 extends from the battery to the electromagnet 30. From the magnet a wire 67 extends to a convenient point at which it may be grounded on some part of the escapement-mechanism, this point being indicated diagrammatically as the shaft 10. The two contact-springs 41 and 42 are connected, respectively, through wires 68 and 69, with the contact-screws 47 and 46. The circuit is completed through the thermostatic spring and the lever 52, these parts being connected by grounding through the mechanism of the thermostat.

The operation of the mechanism as a whole is a follows: With the parts in the position of Fig. 8, at which they are set for the night, no current can flow from the battery, and the mechanism is thus inoperative until the clock reaches the time for which it has been set. When this occurs the winding-key 61 rotates and swings the lever 58, and the latter swings the lever 52 from its extreme low-temperature position to a high-temperature position. By this movement the lever 52 is engaged with the contact-spring 63, and the main circuit is closed at this point. Owing to the prevailing low temperature the thermostatic spring 45 will be at this time in engagement with the contact-screw 47, and current will then flow from the battery through the wire 64, the contact-spring 63, the lever 52, the thermostatic spring 45, the contact-screw 47, the wire 68, the contact-spring 41, the contact-block 43, and the mechanism of the escapement to the wire 67, and thence through the magnet and back, through the wire 66, to the battery. The magnet will then cause the escapement-mechanism to perform a half-rotation, during which the circuit will be broken by the disengagement of the contact-block 43 and the spring 41. When the escapement-mechanism comes to a rest after the half-rotation, during which the drafts of the heater have been opened, the contact-block 44 will be in engagement with the contact-spring 42, but no current will flow because the thermostatic spring will still be in engagement with the contact-screw 47. When the temperature has risen, however, above the degree to which the thermostat is regulated, the thermostatic spring will engage the contact-screw 46, thus permitting current to flow through the wire 69, the contact-spring 42 and the block 44, so as to cause another actuation of the escapement-mechanism, and these operations will occur alternately thereafter, in the usual manner, so often as may be necessary to regulate the temperature.

While the several features of the present invention are preferably employed in conjunction to produce a simple and effective thermostatic regulator, it will be understood that they are not necessarily so combined, and that in general the invention is not limited to the embodiment thereof hereinbefore described and illustrated in the accompanying drawings, but may be embodied in various other forms within the nature of the invention as it is defined in the following claims.

I claim:—

1. In combination with a power actuated member adapted for connection with the drafts of a furnace, an electrically operated escapement for said power actuated member, a thermostatically operated circuit controller for said escapement manually adjustable for different temperatures, a switch included in the circuit of the thermostatically operated circuit controller and connected to the thermostatically operated circuit controller to be moved to open position, when the thermostatically operated circuit controller is adjusted to a certain position, and a clock mechanically connected to the last named switch to shift the latter to closed position at a predetermined time.

2. In combination a power actuated member adapted for connection with the drafts of a furnace, an electrically operated escapement for said power actuated member, a thermostatically operated circuit controller for said escapement, a switch included in the circuit of the thermostatically operated circuit controller, and mechanically connected to the thermostatically operated switch so that when the latter is adjusted to a certain position, the switch will open its circuit, and a clock controlling the switch to swing the latter to close the circuit.

3. In a thermostatic regulator, the combination of a power-actuated rotary member adapted for connection with the drafts of a furnace, thermostatically-controlled escapement-mechanism for permitting successive semi-rotations of the rotary member, a dashpot, and cam-mechanism connecting the dash-pot with the rotary member and arranged to act through an increasing radius, so as to subject the rotary member to a retarding force increasing toward the latter part of each semi-rotation.

In testimony whereof, I affix my signature in presence of two witnesses.

WILLIAM C. HEINDL.

Witnesses:
L. THON,
C. W. CARROLL.